May 18, 1943. F. W. COTTERMAN 2,319,388
HYDROMECHANICAL TRANSMISSION GEARING
Filed June 3, 1940 4 Sheets-Sheet 2
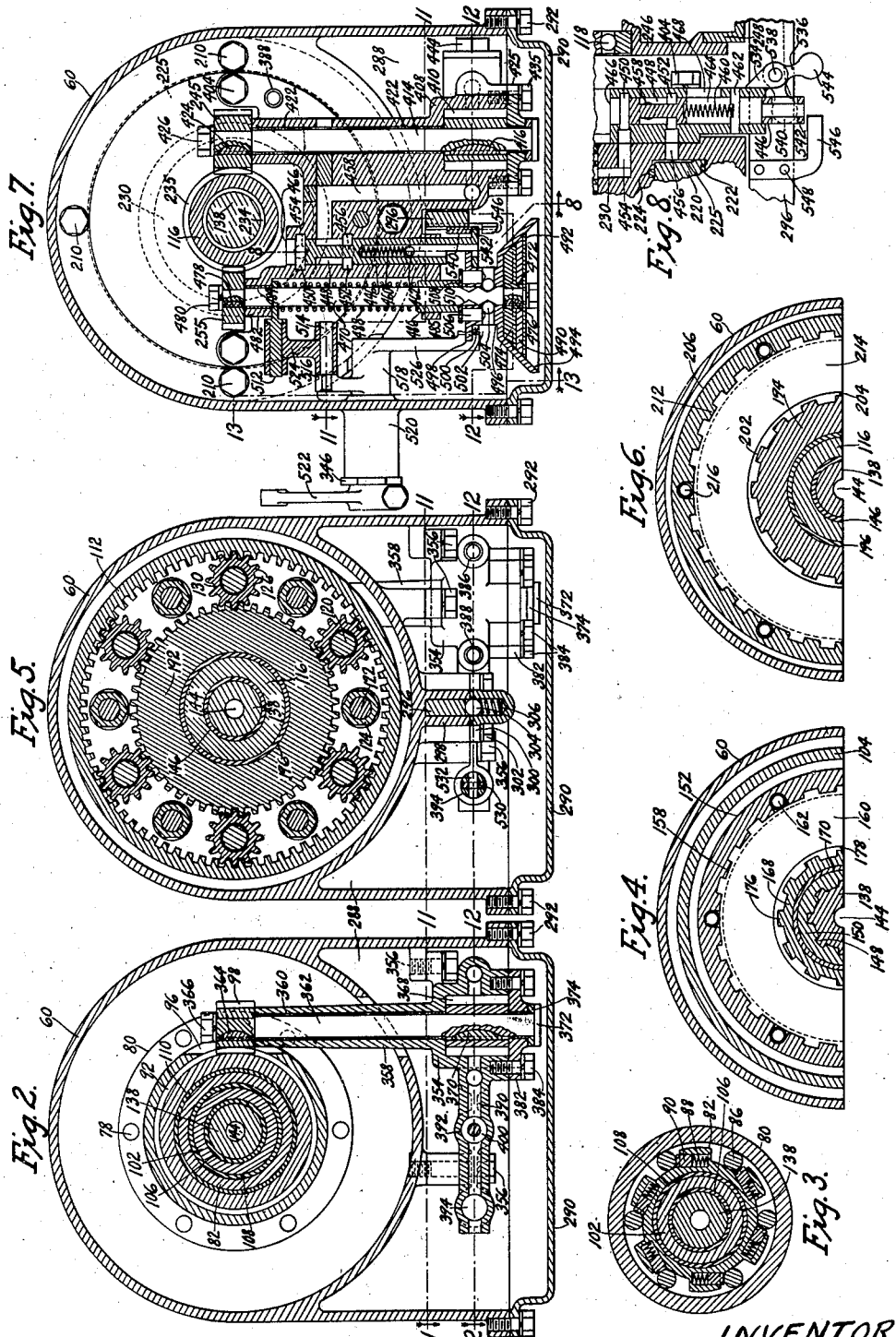
INVENTOR
Frederick W. Cotterman

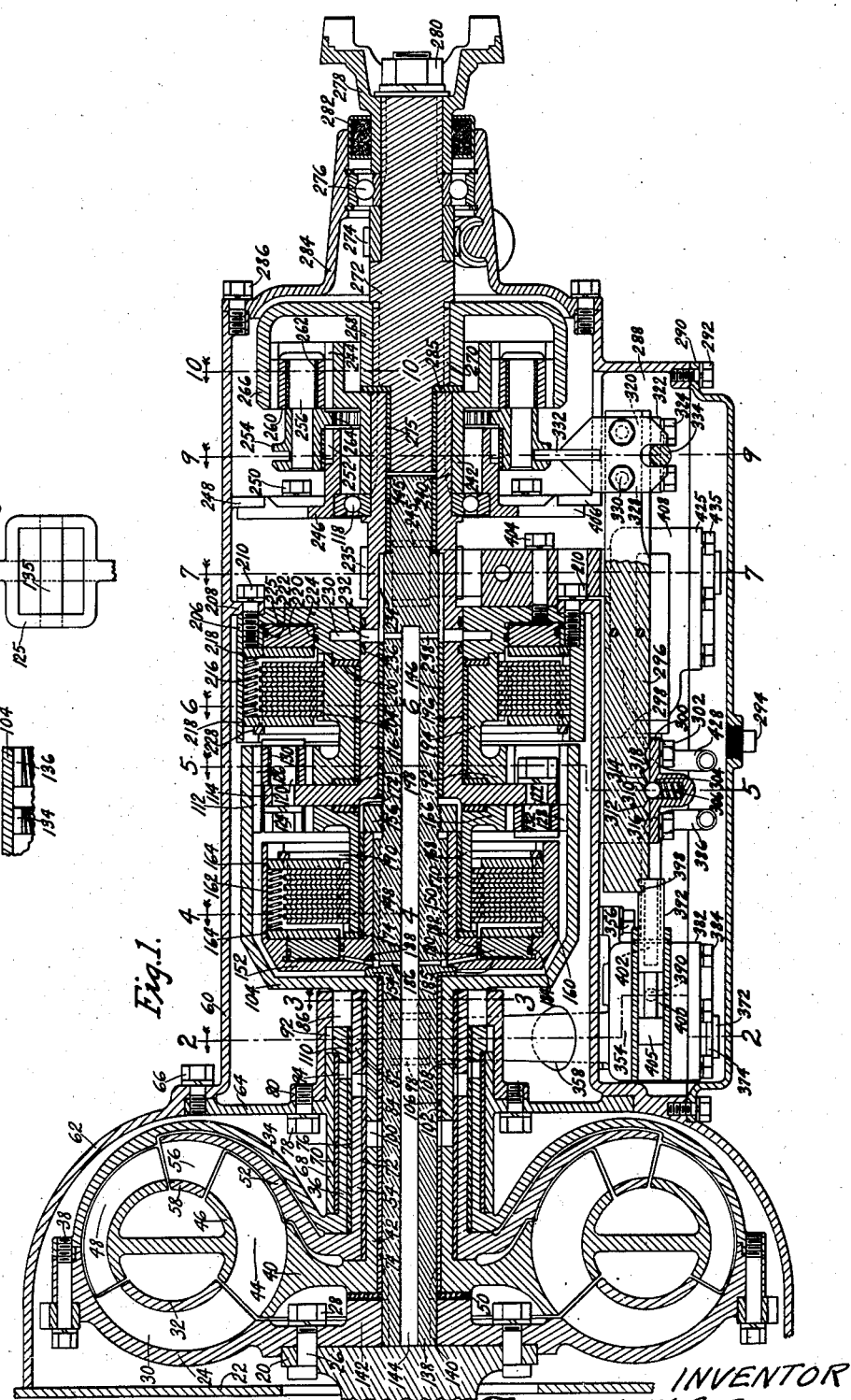

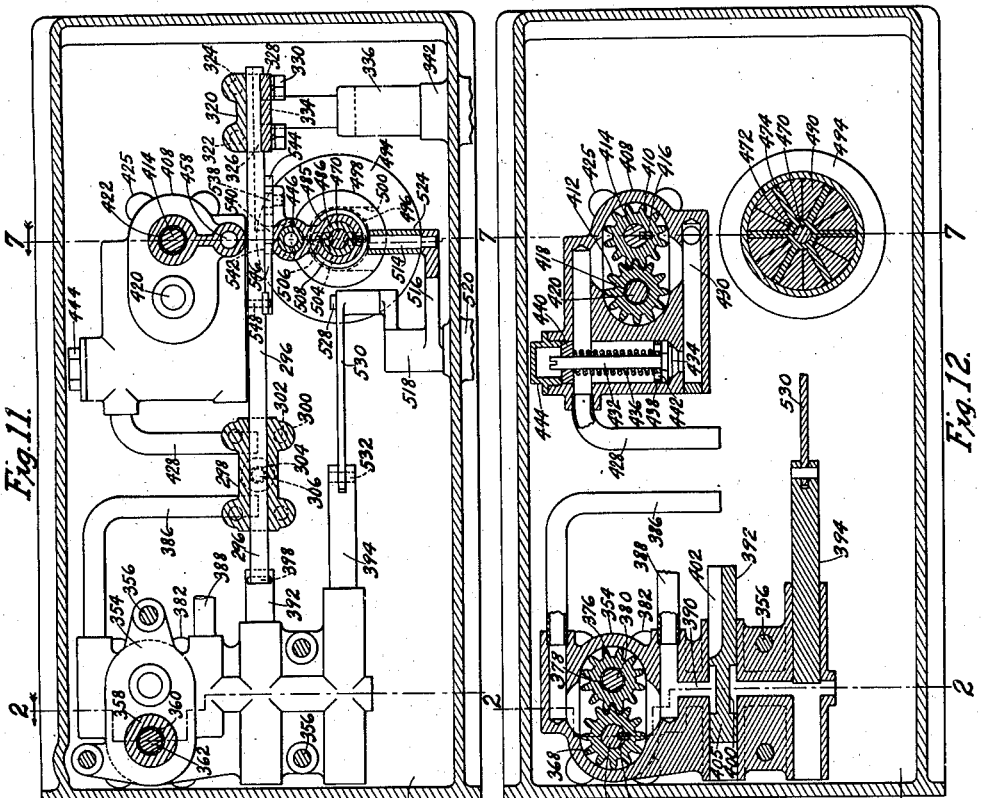
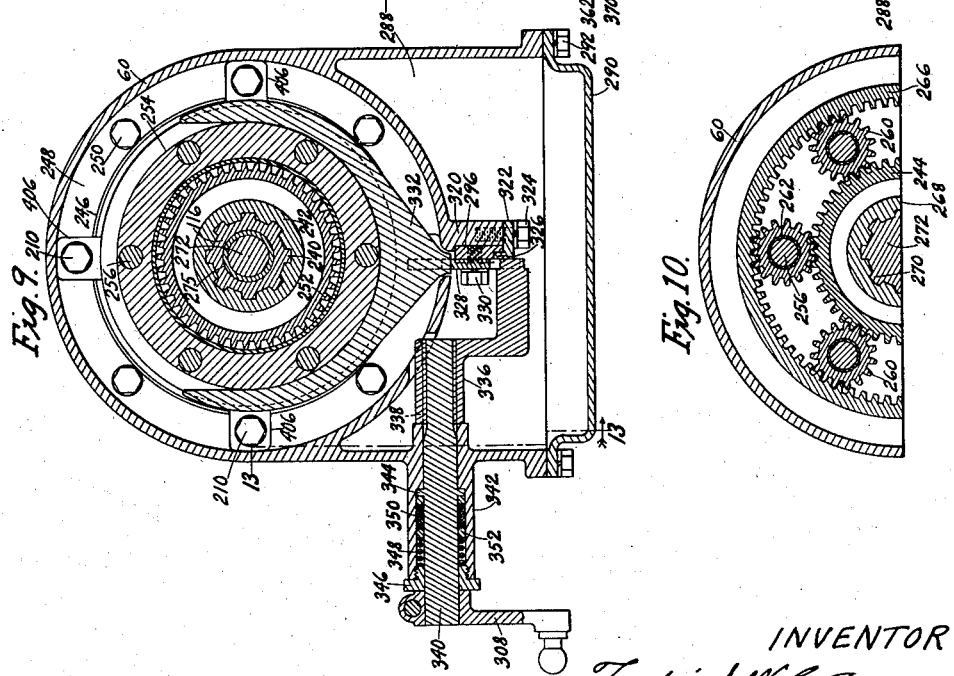

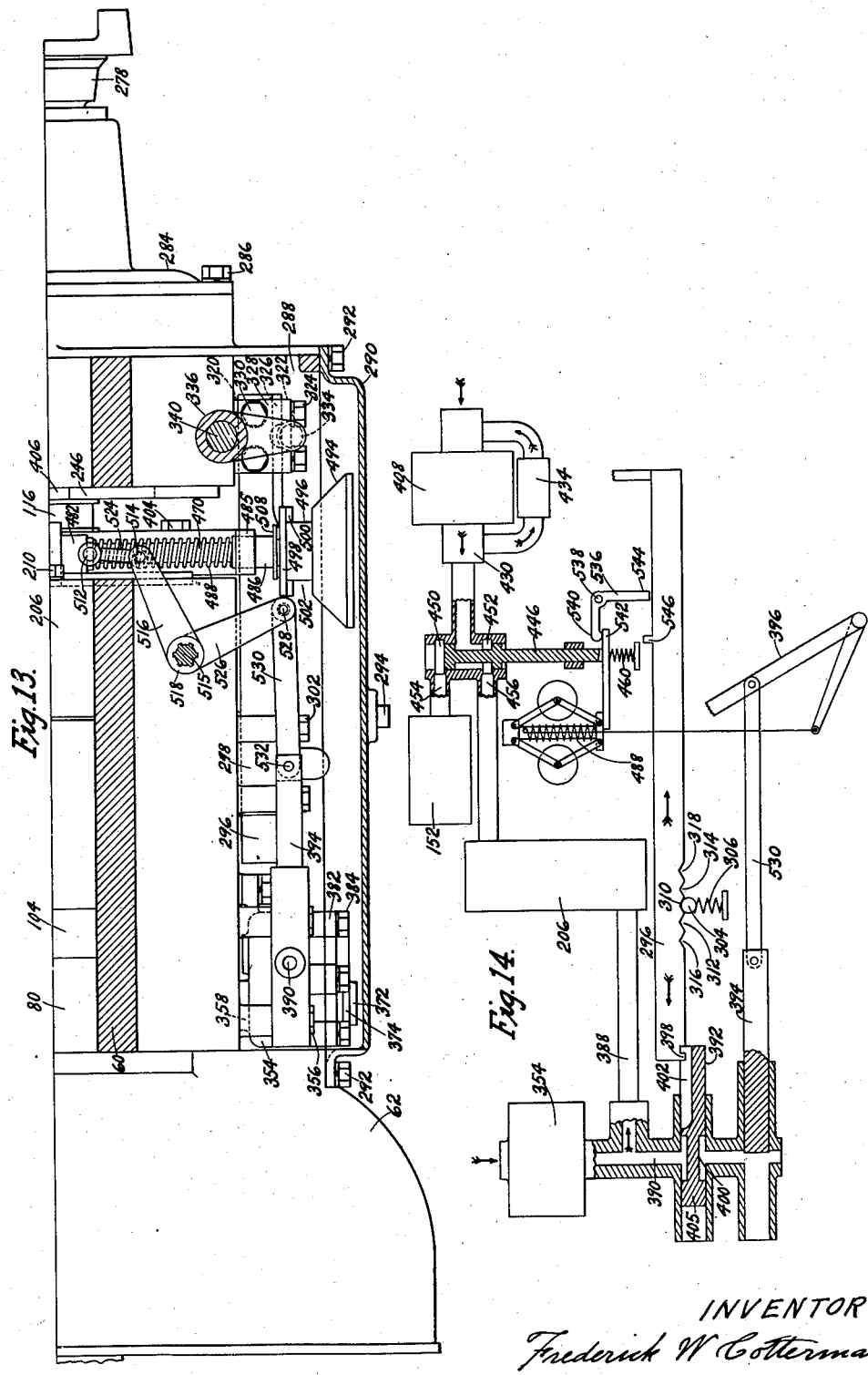

Patented May 18, 1943

2,319,388

UNITED STATES PATENT OFFICE 2,319,388

HYDROMECHANICAL TRANSMISSION GEARING

Frederick W. Cotterman, Dayton, Ohio

Application June 3, 1940, Serial No. 338,525

30 Claims. (Cl. 74—472)

This invention relates to power transmission mechanism for connecting a driving and driven member in variable speed ratio, and particularly to that type of transmission wherein a hydraulic unit and a toothed gear-set are combined to provide a more extended range of ratios. It is particularly applicable to automotive use in combination with an internal combustion engine.

An object of the invention is to provide, with the combination of a single hydraulic unit and a single toothed gear-set, a range of ratios equal to the conventional four speed transmission now in general use, but which will be infinitely variable from one ratio to the next, except for a single step at which the engine speed is required to be reduced only slightly in relation to the vehicle speed.

The hydraulic unit of the mechanism is of that class which operates both as a fluid clutch and a speed reducing, torque multiplying turbine. It comprises an impeller or pump, a two stage rotor or runner and a stator or guide wheel between the two stages. The impeller is the input member of the unit and, as such, is permanently secured directly to the engine for unitary rotation therewith. The rotor is the output member of the unit, and the stator the reaction member, the stator being held against backward rotation during torque multiplication by a one way clutch, which allows it to idle forwardly when the impeller and rotor assume a substantially one to one driving relation as in a clutch.

One of the shortcomings of a hydraulic unit of this type is that, while it is substantially infinitely variable as relates to speed, as a torque converter its efficiency falls off very rapidly when operating above or below the ratio for which it is designed, so that, since it is impracticable to design a single hydraulic unit which will convert torque efficiently over the range of ratio changes required in an automotive vehicle, the device herein shown includes a toothed gear-set of the ring, sun and planet type, connected in series with the hydraulic unit, the ring gear being the driving member, the sun gear the reaction member, and the planet pinion carrier the driven member. The ring gear of the toothed set is permanently secured to the rotor of the hydraulic unit for unitary rotation therewith. A multiple disc brake holds the sun gear against backward rotation when torque is to be multiplied thru the toothed gear set.

Another drawback in a hydraulic unit of the character herein shown is that, when it is called upon to act as a clutch, as when the engine is idling and the vehicle is stopped, the impeller continues to exert considerable tendency to drag the rotor forwardly with it, so that, unless a brake is provided for the rotor, either the control lever must be put into neutral, or the vehicle brakes must be kept applied to prevent the vehicle creeping forward.

It is therefore another object of this invention to provide a single manually controllable means so constructed and arranged that when the engine idles and the vehicle is stationary, the control lever need not be shifted to neutral and the vehicle brakes need not be applied, this result being accomplished by allowing the sun gear of the toothed gear-set to idle backwardly, whereby the rotor may follow the impeller without creating any tendency to move the vehicle.

Another difficulty in designing a combined hydraulic torque converter and clutch of the kind herein employed, is that the modern automotive vehicle, particularly the passenger car, has the center of gravity of its engine so low that the flywheel diameter is severely restricted, so that, when the torque converter must be designed with the same limitation as to diameter, its capacity as a clutch is much below that desired, which results in a slippage between the impeller and rotor, often as much as ten per cent. This has led to the use of an arrangement sometimes referred to as a two path power flow, which comprises differentially loading the rotor so that it is required to carry only approximately half the engine torque, the other half being taken directly off of the engine. With this lightening of the load on the rotor, the slippage, when acting as a clutch, is often reduced to as little as two percent.

It is therefore another object of this invention to so proportion and arrange the mechanism that the rotor will be required to carry all of the torque being transmitted at such times as there is preferably a considerable difference in speed between the impeller and rotor, i. e., during heavy torque multiplication, and will be required to carry only about half the torque at such times as the hydraulic unit is still multiplying torque but is approaching the condition of a clutch having a one to one drive.

Altho free wheeling, as a general proposition, has been rejected by the motoring public, it has more recently been recognized that, at low vehicle speeds, free wheeling is an advantage, provided that engine braking will be inherent at the higher vehicle speeds to assist the brakes in quickly reducing the vehicle speed.

Furthermore, most motorists, in descending very steep grades, as are found in mountainous country, prefer to shift into second gear, altho it is often quite difficult when the need for it suddenly appears while the vehicle speed is 50 M. P. H., or over.

It is therefore another object of this invention to provide means whereby free wheeling is inherent at speeds below 15 M. P. H., engine braking in fourth speed or high is inherent at all speeds above 15 M. P. H., and the manual control is so arranged that a shift to second gear for engine braking in second may be instantly made at any vehicle speed without difficulty or injury to the mechanism.

Many motorists when parking a vehicle on a street having a considerable grade, do not depend entirely on the vehicle brakes, but, after stopping the engine, shift into a gear ratio, usually reverse. They must then take care that when they return and start the engine, the shift out of reverse is made before the clutch is engaged.

It is therefore another object of this invention to provide means which may be called a hill lock, operable by moving the single manual control to an appropriate position which positively connects the rotating and the nonrotating parts of the transmission in toothed engagement, with the addition of an interlock operable by the same movement which wholly disconnects the engine from the transmission as long as the hill lock is applied, to the end that inadvertence may not result in an application of power to a locked mechanism.

A hydraulic unit of the class herein shown operates best when kept completely filled with the hydraulic medium, and to this end a pump is usually employed which not only keeps it filled but circulates the medium thru it and an outer circuit to reduce the temperature.

Where a toothed gear-set is used in conjunction with the hydraulic unit, it is present practice to operate the clutch and brake units of the toothed gear-set with the same pressure pump or pumps used for filling the hydraulic unit.

It is therefore another object of this invention to provide, for the above purpose, two pumps, one positively connected to the engine for unitary rotation therewith, and the other positively connected to a vehicle driven member for unitary rotation therewith, to the end that, if the engine is operated while the vehicle is at rest, transmission brake actuation may be effected by one pump to start the vehicle, and if the vehicle is allowed to coast with the engine at rest, transmission brake actuation may be effected by the other pump to drive the engine for engine braking.

Since the toothed gear-set shown has associated therewith a transmission brake for holding the reaction member when gear-driving the planet pinion carrier, and a transmission clutch for differentially connecting the same carrier to both the impeller and the rotor of the hydraulic gear-set, some appropriate means is preferably provided which will, at a proper speed, release the transmission brake and apply the transmission clutch or vice versa.

It is therefore another object of the invention to provide a centrifugal device which normally acts at a fixed vehicle speed to change from transmission brake application to transmission clutch application, then so connect the engine accelerator to the centrifugal device that the vehicle speed at which the device normally acts is raised in proportion to the extent of accelerator actuation, to the end that when rapid acceleration is desired, and indicated by heavy accelerator depression, the gear-set will maintain torque multiplication up to a proportionally higher vehicle speed.

That these and many other objects are attained, will become evident as consideration is given to the following description and reference is made to the drawings, wherein, Fig. 1 is a longitudinal vertical axial section thru a transmission made according to the invention.

Fig. 2 is a transverse section thru the front or engine driven pump and its valves taken at 2—2 of Fig. 1.

Fig. 3 is a transverse section thru the roller clutch which holds the stator of the hydraulic unit from backward rotation. It is taken at 3—3 of Fig. 1.

Fig. 4 is a half transverse section thru the multiple disc transmission clutch which differentially connects the planet pinion carrier of the toothed gear-set to the impeller of the hydraulic unit, the section being taken at 4—4 of Fig. 1.

Fig. 5 is a transverse section, taken at 5—5 of Fig. 1, thru the toothed gear-set and manual shift bar.

Fig. 6 is a half transverse section, taken at 6—6 of Fig. 1, thru the multiple disc transmission brake which holds the reaction member of the toothed gear-set from rotating.

Fig. 7 is a transverse section thru the rear or vehicle driven pump, and thru the centrifugal device and the linkage which connects it to the accelerator taken at 7—7 of Fig. 1.

Fig. 8 is a fragmentary section, taken at 8—8 of Fig. 7, thru the centrifugally controlled valve of the rear or vehicle driven pump.

Fig. 9 is a transverse section taken at 9—9 of Fig. 1, thru the manually operable shifting mechanism of the reversing gearing.

Fig. 10 is a half transverse section, taken at 10—10 of Fig. 1, thru the reversing gearing.

Fig. 11 is a horizontal section taken at 11—11 of Figs. 2, 5 and 7, the section being deflected upward in Fig. 7 to show parts of the linkage of the accelerator control of the centrifugal device.

Fig. 12 is a horizontal section, taken at 12—12 of Figs. 2, 5 and 7, the section being deflected downward in Fig. 7 to show the construction of the centrifugal device.

Fig. 13 is a longitudinal vertical section, taken thru Figs. 7 and 9, showing some of the parts which are to be operated by the engine accelerator in controlling the mechanism.

Fig. 14 is a schematic representation of the accelerator control of the device.

Fig. 15 is a modification of the ring gear structure of the toothed gear-set, and, Fig. 16 shows an alternate form of planet pinion carrier.

Like numerals refer to like parts thruout the several views.

Construction

To the crank shaft 20 of an engine 22, an impeller 24 is secured by bolts 26 and nuts 28. Circumferentially spaced impeller blades 30 and an inner shroud 32 are integral with the body of the impeller 24. An impeller cover 34 having a rearwardly extending hub 36 is secured to the impeller 24 by bolts 38. The flange and cover enclose a toroidal space as is usual in this type of gear, and together they function also as the fly wheel of more general practice.

Fitting relatively close within the toroidal space is the rotor 40 which carries integral therewith a rearwardly extending hub 42. A series of second stage blades 44 are an integral part of the rotor, a toroidal core 46 is integral with the blades, while a series of first stage blades 48 are spaced around the periphery of the core. A thrust washer 50 separates the hubs of the impeller and rotor.

The stator 52 has a rearwardly extending hub 54 and a series of integral blades 56 shrouded on the inner edges as at 58. The stator blades 56 are interposed between the first and second stage rotor blades 48 and 44.

The transmission housing 60 is enlarged as for a flywheel housing at the front end 62 and contains the hydraulic unit. A circular partition plate 64, held to the housing by screws 66, has a hub 68 within which a bearing bushing 70 is press fitted. Bearing bushings 72, 74 and 76 are press fitted into hubs 54, 42 and 36 respectively, whereby one hub may rotate freely within the next.

Held to the rear face of the partition plate 64 by the screws 78 is the roller brake 80, the inner member 82 of which is end splined at 84 to the stator hub 54. Rollers 86 are held in contact with the outer and inner parts of the brake in the usual manner by springs 88 and plungers 90 (see Fig. 3). The roller brake 80 is designed to prevent backward rotation only of the stator 52.

The front pump driving gear 92 is end splined at 94 to the hub 36 of the impeller cover 34, whereby the driving gear always rotates at engine speed. The body of the roller brake 80 is cut away at 96 (see Fig. 2) to permit the pump gear 98 to mesh with the driving gear.

End splined at 100 to the rotor hub 42 is the forwardly extending hub 102 of the ring gear drum 104. Bearing bushings 106, 108 and 110 are press fitted into the parts 102, 82 and 92 respectively whereby one may rotate freely about the other.

The drum 104 carries the ring gear 112, which, in the instant case, is integral therewith, altho the gear may be separately made and attached to the drum for unitary rotation if desired. The ring gear 112, thus attached to the driven member of the hydraulic gear-set, is the driving member of the toothed gear-set.

A planet pinion carrier 114 has a long hub 116 which extends rearwardly into the reversing gear-set. The hub 116 is rotatably supported near its rear end by the ball bearing 118.

Carrier 114, near its periphery, has six equally spaced studs 120 extending from its rear face, and six equally spaced studs 122 interspaced between the first six, but extending from its front face. Both sets of studs are held in the carrier by nuts 124. The six studs 120 carry planet pinions 126, while the six studs 122 carry the somewhat narrower faced planet pinions 128. Pinions 126 and 128 are provided with bearing bushings 130 and 132 respectively.

Instead of the planet pinion carrier 114, there may be substituted a carrier 115, which, instead of having oppositely extending studs 120 and 122 for separate pinions 126 and 128, has a series of frame like structures 125 spaced at intervals around its periphery (one frame only shown), and longer studs 135 may be used to support pinions which will have faces as wide as the teeth of the ring gear 112. In this case, six only of the wide faced pinions will be required.

The teeth of the ring gear 112 are axially of such length that they are in constant mesh with both pinions 126 and 128, but may be made as in Fig. 15, where two separate gears 134 and 136 are cut in the same ring. Obviously the two gears 134 and 136 may be cut separately and attached to the drum 104 in the spaced apart relation shown.

A drive shaft 138 has external splines 140 which fit into internal splines in the impeller hub 142, whereby the shaft at all times has unitary rotation with the impeller and the engine. An oil duct 144 extends from the front end of the shaft to near its rear end.

The extreme rear end has rotative bearing in a bushing 145 which is press fitted into the carrier hub 116, and further forward a bearing bushing 146, also press fitted into the carrier hub, is rotatable on the shaft.

The middle portion of the shaft 138 has external splines 148 to which the internal splined hub 150 of the clutch frame 152 is fitted. Hub 150 is clamped between a collar 154 which is integral with the shaft and a nut 156 which is threaded thereon.

The rim of the frame 152 has internal splines 158 (see Fig. 4), over which the external notches of the clutch discs 160 are slidable. At six equally spaced places, the spaces between adjacent splines 158 are deepened to provide pockets for the springs 162. The two outside clutch discs 164 (see Fig. 1), which are thicker than the intermediate discs, have external tongues which fit slidably in the pockets. The springs 162 are under stress sufficient to urge the outer discs 164 apart whereby the intermediate discs may also spread apart.

A sun gear 166 has a forwardly extending hub 168 to which a bearing bushing 170 is press fitted. The bushing 170 is freely rotatable on the hub 150, and the sun gear is in constant mesh with the planet pinions 128. Thrust washers 172 and 174 limit axial movement of the sun gear 166. The sun gear hub 168 has external splines 176 (see Fig. 4), over which the internally notched clutch discs 178 are slidable. The internally notched clutch discs 178 are interspaced between the externally notched clutch discs 160.

A ring piston 180, having seal rings 182 and 184, is axially slidable in a recess in the frame 152. Oil holes 186 and 188 connect the main oil duct 144 to a small space 185 behind the piston. A ring 190 is sprung into an internal groove in the frame 152 thus forming an abutment for the discs when the piston 180 acts to compress them. Engagement of the clutch connects the normally free sun gear 166 for unitary rotation with the impeller and the engine, which, thru the planet pinions and ring gear also connects the sun gear 192 for unitary rotation with the impeller and the engine.

The sun gear 192, which is in constant mesh with the planet pinions 126, has a rearwardly extending hub 194 to which a bearing bushing 196 is press fitted. Bushing 196 is freely rotatable on the carrier hub 116. Thrust washers 198 and 200 limit axial movement of the sun gear 192. The sun gear hub 194 has external splines 202 (see Fig. 6) over which the internal notches of the brake discs 204 are slidable.

The brake frame 206 is secured to an inwardly extending rib 208 of the housing by the screws 210. The rim of the brake frame has internal splines 212 (see Fig. 6) over which the external notches of the brake discs 214 are slidable. The externally notched brake discs 214 are interspaced between the internally notched brake discs 204. At six equally spaced places, the spaces between adjacent splines 212 are deepened to provide pockets for the springs 216.

The two outside brake discs (see Fig. 1), which are thicker than the intermediate discs, have external tongues which fit slidably in the pockets. The springs 216 are under stress sufficient to urge the outer discs 218 apart whereby the intermediate discs may also spread apart.

A ring piston 220, having seal rings 222 and 224, is axially slidable in a recess in the frame 206. A pipe 388 (see Figs. 5 and 7), connects the discharge side of the front or engine driven pump to the narrow space 225 behind the ring piston 220. This same narrow space is also normally connected to the discharge side of the rear or vehicle driven pump by conduits in the rear pump body (see Fig. 8), which will be hereinafter described.

When either pump discharges into the narrow space 225, the brake discs will be compacted. A ring 228 is sprung into an internal groove in the frame 206, thus forming an abutment for the discs when the piston 220 acts to compress them. Engagement of the brake holds the normally free sun gear 192 against rotation which, thru the planet pinions and ring gear also holds the sun gear 166 against rotation. Thus it will be seen that the sun gears 166 and 192 operate substantially as one gear, i. e., when one is held against rotation the other cannot rotate, and when one is connected for unitary rotation with the engine, the other must also rotate at engine speed. This result is attained for the following reasons:

The ring gear 112 is in mesh with both sets of pinions 126 and 128. Pinions 126 and 128 both have the same number of teeth. Both sets of pinions are mounted on the same carrier 114. Both sun gears 166 and 192 have the same number of teeth and both are in mesh with the pinions having the same number of teeth. Therefore neither of the sun gears can be stopped without stopping the other and neither can rotate unless the other rotates in unison with it. Rotation of the sun gear 166 may be arrested by holding the sun gear 192, while the sun gear 192 may be compelled to rotate at impeller speed by connecting the sun gear 166 to the impeller. This is exactly what is done.

The hub of the brake frame 206 has an internal annular groove 230 in line with which several oil passages 232 extend thru the carrier hub 116 and into the space 234 between the hub 116 and shaft 138.

Seal rings 236 are sprung into grooves in the hub 116 adjacent the passages 232. Small oil holes 238 connect the space 234 to the main oil duct 144. The hydraulic gear-set is kept filled with the oil under pressure from the main duct thru the space between the splines 140 and the splines of the hub 142. Circulation is maintained thru the oil grooves (not shown) in the bearing bushings 72, 74 and 76.

The driving gear 235 for the rear or vehicle driven pump is shown integral with the hub 116 but, of course, may be made separately and secured thereto. The rear pump gears 245 and the centrifugal governor gear 255 (see Fig. 7), both receive rotation from the gear 235. The discharge side of the rear or vehicle driven pump is connected to the groove 230 in a manner which will be hereinafter described.

The rear end of the planet pinion carrier hub 116 has external splines 240 over which the internally splined hub 242 of the reversing sun gear 244 is fitted. A plate 246 for supporting the ball bearing 118 is held to an inwardly extending rib 248 of the housing by screws 250. The plate 246 has a rearwardly extending hub upon which are teeth 252 of the same dimensions and number as are on the sun gear 244.

The reversing carrier 254 contains six equally spaced studs 256 upon which planet pinions 260 are rotatably supported on bearing bushings 262 and in mesh with the sun gear 244. A series of internal teeth 264 are slidable forwardly to two positions over the teeth 252, or rearwardly to two positions over the teeth of the sun gear 244, the central position shown being the neutral position.

The reversing ring gear 266 is in constant mesh with the planet pinions 260, and, since all of the reversing gears are non helical, the pinions are slidable freely thru both sun and ring gears. The ring gear 266 has a forwardly extending hub 268 internally splined to fit over the external splines 270 of the tail shaft 272. The tail shaft carries the usual speedometer gear 274 which, in common with the ball bearing 276 and universal joint part 278, are held on the tail shaft by the nut 280.

Packing 282 may be inserted in the usual manner to prevent oil leakage. The rear bearing head 284 supports the bearing 276 and closes the rear end of the housing 60, to which it is secured by screws 286. The front end of the tail shaft 272 is rotatable in a bearing bushing 275 which is press fitted in the rear end of the carrier hub 116. A washer 285 holds the sun gear 244 from moving axially rearward.

Formed integrally on the lower side of the housing 60 is a compartment 288 for housing the several control means. A removable pan 290 held on by screws 292 closes the lower side of the compartment. The oil pumps which operate the clutch and brake and circulate the oil thru the hydraulic gear, and their controls are contained in this compartment and are submerged in the oil therein. A drain plug 294 is provided for changing the oil.

The manually operable shifting bar 296 is slidably held near the front end and between integral guide pieces 298 depending from the lower side of the housing.

A cap 300 is held to the bottom of the guide pieces by screws 302. Cap 300 contains a detent ball 304 urged upward by a spring 306. The bar is movable to five positions, the arm 308 (see Fig. 9), for moving the bar being preferably connected by a rod to a hand control lever on the steering column (not shown). Detent notches 310, 312, 314, 316 and 318 (see Fig. 1), are formed in the lower edge of the bar to locate the several positions and hold them when located. The sides of the notches are so sloped that it requires little effort to shift from the neutral notch 310 to the forward notch 312, or reverse notch 314, but greater effort to shift farther into the engine braking notch 316 or, the hill lock notch 318.

Near the rear end, the bar 296 is held to a guide piece 320 which depends integrally from the housing. A gib 322 is held to the piece 320 by screws 324, the gib having a rib 326 which engages a groove in the bar (see Fig. 9). A base plate 328 is notched into the bar and held thereto by screws 330. The base plate 328 carries the shifting fork 332, the fork being set into a notch in the plate and welded. Fork 332 fits freely in a groove in the carrier 254.

The bottom edge of the base plate 328 has a U shaped notch into which the free end 334 of a shifting crank extends (see Fig. 1). The hub 336 of the crank (see Fig. 9), is internally splined to fit the external splines 338 on the shaft 340 which may rock in the bearing hub 342. An integral collar 344 on the shaft limits axial movement.

A nut 346 closes the packing box wherein a spring 348 compresses the packing 350 between the two washers 252. Obviously, by appropriate manipulation of the arm 308, the bar 296 may be shifted to any of its five positions.

Referring to Fig. 1, the shifting bar 296 with its fork 332 are shown in neutral, the internal carrier teeth 264 being neither engaged with the teeth of the sun gear 244 nor the non rotative teeth 252. If the bar 296 is moved one space rearward, so that the detent ball enters the forward driving notch 312, the carrier hub 116 and the tail shaft 272 will be locked together for unitary rotation. If the bar is moved two spaces rearward, so that the detent ball enters the engine braking notch 316, the same locked up condition of the reversing gears maintain, but this latter movement of the bar is employed to affect both the operation of the front pump and the rear pump as will later appear.

If the bar is moved one space forward, so that the detent ball enters the reversing notch 314, the teeth 264 of the reverse gear carrier will have entered the nonrotatable teeth 252 sufficiently to hold the carrier 254 nonrotative, whereby the tail shaft will rotate rearwardly for reverse. If the bar is moved two spaces forward, so that the detent ball enters the hill lock notch 318, the carrier teeth 264 will have moved deeper into the nonrotatable teeth 252 and the teeth of the planet pinions 260 will also have entered the nonrotatable teeth 252, whereby the tail shaft 272 is positively tooth locked to the housing for hill parking.

This latter movement of the bar also so influences the pumping circuits that, while the hill lock is thus engaged, no oil may be directed by either pump to the clutch or the brake.

The front or engine driven pump has a body 354 secured to the underside of the housing 60 by screws 356. A long bearing hub 358 has bushings 360 for the shaft 362. The pump gear 98 is secured to the shaft by the key 364 and nut 366 (see Fig. 2). The first impeller gear 368 is secured to the shaft by the key 370. A head 372 and thrust collar 374 prevents upward movement of the shaft in its bearings.

The second impeller gear 376 has a bearing bushing 378 freely rotatable on a stud 380. A cover 382 encloses the pumping chamber, being held to the body by the screws 384. The suction pipe 386 extends to a central position in the sump. The discharge pipe 388 extends to the brake frame 206, entering its rear wall (see Fig. 7) thus connecting the discharge side of the front pump directly to the space 225 (see Fig. 1) behind the ring piston 220.

A bleeder duct 390 extends laterally from the discharge side of the pump and two plunger valves 392 and 394 influence the pump discharge thru the bleeder. When both of these valves are open, the pump is ineffective to deliver oil under pressure thru the discharge pipe 388.

Valve 394 is normally open, but is connected to the accelerator pedal 396 (see Fig. 14) in such a manner that whenever the accelerator is depressed slightly, that is, to a position which will raise the engine speed about 100 R. P. M. above the idling speed, the valve 394 will close the bleeder duct 390, and the pump will deliver oil under pressure to apply the transmission brake.

Valve 392 has a groove across the top edge, and a tongue 398 (see Fig. 1), on the front end of the shifting bar 296, extends into this groove, whereby the valve 392 moves to five positions in unison with the shifting bar.

Valve 392 is normally open and the necked in portion 400 is long enough that when the shifting bar is in neutral, forward, or reverse, i. e., with the detent ball in notch 310, 312 or 314, the valve will remain open, but when the shifting bar is put into engine braking position, with the detent ball in the notch 316, the larger end portion 405 of the valve (see Fig. 12), will shut off the duct 390 irrespective of any action of the accelerator controlled valve 394, so that, when the control is pulled to the engine braking position, engine braking will be had, whether the engine is being accelerated, is idling, or is dead. It should be noted, however, that when the engine is dead and the vehicle coasting, dependence is placed in the rear pump, which is also connected to the brake, to operate it for engine braking.

When the shifting bar is placed in the hill lock position, i. e., with the detent ball in the notch 318, the valve 392 will be positioned to bleed the duct 390 thru the channel 402 (see Fig. 12), so that, in the hill lock position, the engine may be started and warmed, and the accelerator operated to race the engine, without danger of applying the pressure to the transmission brake and power to the locked vehicle.

The rear or vehicle driven pump, its relief valve, the speed controlled valve which normally makes connections to bleed the clutch and feed the brake but is operable to another position to feed the clutch and bleed the brake, and the centrifugal governor which operates the speed controlled valve, are all embodied in one integral casting which is secured to the rear face of the brake frame 206 by the screws 404, thereby making all necessary connections and eliminating piping. Notches 406 (see Figs. 1 and 9), are cut into the rib 248 and plate 246, so that the screws 404 and 210 may be conveniently tightened from the rear with a socket wrench.

The rear pump casing 408 contains the impeller gears 410 and 412, the gear 410 being connected to the shaft 414 by the key 416, while the gear 412 is provided with a bushing 418 rotatable on the stud 420. The shaft 414 is rotatable in bearing bushings 422 and the pump gear 245 is secured to the upper end of the shaft by the key 424 and nut 426.

A short suction pipe 428 extends to a point near the middle of the sump. A cover 425 is held to the underside of the pump body by the screws 435.

The discharge side 430 of the rear pump is connected back to the suction side thru the relief valve (see Fig. 12), which comprises a valve stem 432 with valve head 434 urged to its seat by a spring 436. Valve stem guide washers 438 and 440 keep the valve head concentrically positioned with its seat. The washer 438 has a circular row of holes 442 thru which the oil may pass. A threaded cap 444 closes the outer open end of the valve chamber.

The speed controlled valve comprises a stem 446, necked in near the upper end at 448. Stem 446 is slidable in an opening in the casting and the opening has internal annular grooves 450 and 452. Groove 450 is connected by a passage 454 to the internal annular groove 230 in the brake frame, while groove 452 is connected by a passage 456 to the space 225 behind the ring piston 220. A passageway 458 connects the discharge side of the rear pump to the necked in portion 448 of the valve.

Valve stem 446 is drilled from the bottom upward for the spring 460, the bottom end of which rests on the cross pin 462. The stem is cross slotted as at 464 (see Fig. 8), so that it may move vertically in relation to the pin. When the valve is in the normal position shown in the drawings, the clutch bleeds out thru the groove 230, passage 454 and groove 450, and the brake is fed thru the passage 458, neck 448, groove 452 and passage 456.

When the valve is allowed, by the centrifugal governor to move to its upper position, which is with its upper end on the line 466, the brake will bleed out thru passage 456, groove 452, slot 464, and a slot 468 in the casting, while the clutch will be fed by the rear pump only thru the passage 458, neck 448, groove 450, passage 454 and groove 230. The valve therefore, normally directs oil under pressure to engage the brake for gear driving but shifts upward to a position which directs oil under pressure to engage the clutch for direct driving. It should be noted that normally both front and rear pumps are connected to pump to the brake and therefore the same relief valve which serves the rear pump will also serve the front pump, thereby eliminating one relief valve. The relief valve is necessarily provided for the reason that when the clutch or brake space is filled to capacity the pumps continue in rotation, so that the extra capacity of the pumps, over that required to keep the hydraulic unit filled and other leakage, must have outlet.

The centrifugal governor which operates the valve 446 is rotatable on a shaft 470. A hub 472, having spokes 474 is secured to the lower end of the shaft by a key 476. The gear 255 is held on the upper end of the shaft by a key 478 and nut 480.

A hub 482 having a bushing 484 press fitted therein rotatably supports the upper end of the shaft 470, while a heavier bushing 486, vertically slidable in the hub 485, rotatably supports the lower end. A spring 488 urges the vertically slidable bushing 486 downward.

Weights 490 have radial slots in their upper surfaces to fit slidably over the spokes 474. A plate 492 prevents the weights moving downward. The outer edges of the weights are beveled, and a frustro-conical member 494 surrounds these beveled ends. Obviously, if the weights move radially outward on the spokes 474, the beveled ends will lift the member 494 upward.

On its upper end, the member 494 has a hub 496 and at the upper end of this hub is a flange 498. The valve 446 has an integral fork 500 which straddles the hub 496 and is held up to the lower surface of the flange 498 by the light spring 460.

If the weights 490 raise the member 494 against the resistance of the heavy spring 488, the light spring 460 may move the valve 446 to its upper position provided it is not otherwise obstructed. With so much space 502 between the flange 498 and the top of the member 494, the member 494 may move to its upper position without moving the valve when the valve is held by other means in the position shown. So also, the valve may shift up when the governor shifts up but may be returned by other means without returning the governor.

In order that the speed controlled valve may move from one of its positions to the other without hesitating in an intermediate position, a detent mechanism is provided for the governor. The hub 496 is cross drilled for the balls 504 and drilled vertically for the studs 506 which are reduced in diameter at their upper ends and riveted in the washer 508. The notches 510 in the shaft have sides cut about thirty degrees with the vertical, while the sides at the lower ends of the studs 506 are about thirty degrees with the horizontal.

With this construction of the detent mechanism, the same spring 488 which opposes the weights 490 from raising the member 494 also supplies the necessary force for the detent. Thus each pound of force of the spring 488 opposes the weights with a pound of force. But each pound of force on the washer 508 produces only a half pound radially inward force on the balls 504, and each half pound radially inward force on the balls 504 may be overcome by one-quarter pound weight force.

Thus before the governor may shift up, the weight force must have become five-fourths of the spring force, while after the governor shifts up, the weight force need be only four-fifths the spring force to maintain the governor in shifted up condition. This will provide an overlap of about 45% in force which, since the force of the weight change with the square of the speed, requires a change of about 22% in speed which is sufficient to prevent hunting.

The governor spring 488, when at the length shown, is under such degree of stress that, if the vehicle is running 15 M. P. H., or over, the governor will shift up and allow the valve 446 to change from the gear drive position shown to the upper or direct drive position. But the length of the spring 488 varies with the extent of accelerator pedal depression being only about one-third the length shown when the accelerator is fully depressed.

At the upper end of the spring 488, a stud 512 (see Fig. 7) has an eye which fits around the shaft 470 freely, and takes the reaction of the upper end of the spring. A second stud 514 is carried by a lever 516 extending from the hub 518 which is rockable on a shaft 515 (see Fig. 13), in the bearing 520 by the arm 522. A link 524 connects the studs 512 and 514 so that movement of one moves the other. Arm 522 may be connected to the accelerator pedal by an appropriate rod (not shown). The packing nut 346 and the packing may be similar to that shown in Fig. 9.

Extending from the hub 518 downward is another lever 526 having a stud 528 at its lower end upon which the hub of a link 530 is rockable. Link 530 is connected to the valve 394 by a pin 532.

It may now be seen why it is desirable to energize the detent mechanism of the governor by the same spring which restrains governor shift, for, if it were not so made, the detent resistance would remain the same upon extreme accelerator depression while the resistance to governor shift would be trebled, in which case the overlap between shift up and shift down at high speed would be about 7% instead of the 22% had at low speed.

In order that engine braking thru the toothed gearing may be had at any time and at any vehicle speed, a means is provided that will, whenever the shifting bar is moved to the engine braking position, i. e., with the engine braking notch 316 over the ball 304, hold the speed controlled valve 446 in its lower position as shown in the drawings, or return it to its lower position if it has previously been shifted to its upper position. This means comprises an ear 534 extending from the rear pump casting (see Fig. 8), to which a bellcrank 536 is hinged by the hinge pin 538.

The one arm 540 rests upon a lateral projection 542 of the valve 446, while the other arm 544 hangs downward in the path of a member 546 which is fastened to the bar 296 by rivets 548. Obviously, when the shifter bar is moved to its extreme rear or engine braking position, the speed controlled valve 446 will be held in its lower or gear drive position, or, if the valve has previously shifted to the direct drive position, it will be returned to the gear drive position.

Proportion

A hydraulic unit of the kind herein shown is a speed torque device, i. e., one in which the R. P. M. at which shift up from reduced drive to direct drive occurs, varies with the torque being transmitted, the R. P. M. at shift up being higher as the torque is greater. It is therefore necessary to take into consideration the H. P. of the engine with which the device is to be used.

Taking the largest diameter of the housing 62 as 15" and making all other parts to the same scale, the device is suitable for an engine of about 110 H. P., at 3600 R. P. M. The blade angles should be such that a 2 to 1 ratio thru the hydraulic unit will be reached at about 600 to 800 R. P. M. of the engine under maximum torque application. The toothed gear-set should have a ratio of 1⅔ to 1. This will take a ring gear with 72 teeth, sun gear with 48 teeth and planets with 12 teeth. The gears selected are 14 pitch, 20 P. A., and 30 degree helix angle.

With a 3.62 to 1 rear axle, the engine-to-wheel ratio thru the transmission and axle will be about 12 to 1 for low gear. The hydraulic unit is further so designed that at 3600 R. P. M. and under maximum torque, the ratio will have gradually risen to 1.4 to 1. The engine-to-wheel ratio will therefore now be about 8.4 to 1. This ratio corresponds to second gear. The governor spring should be such that, with full accelerator depression, an enforced shift up of the governor will occur at 3600 engine R. P. M. The governor spring should therefore be of .047" round wire, coiled ½" pitch diameter, have 17 coils, and a free length of 3.42".

When at 3600 engine R. P. M., which is 1540 carrier R. P. M., the governor shifts up, the impeller and rotor are both differentially connected to the carrier of the toothed gear set. Both could come down in speed to 1540 R. P. M., but the impeller is on the engine and the rotor is free, so the rotor takes the greater drop in speed, bringing the engine down only from 3600 to about 2200 which allows the rotor to revolve 1100 and the carrier to continue at 1540.

The engine-to-wheel ratio is now 2200/1540 × 3.62=5.2 to 1, which corresponds to conventional third gear. When the rotor gains on the impeller until it reaches substantially the same speed, and the stator revolves with both of them, the engine-to-wheel ratio will be 3.62 to 1, which is fourth gear or high.

The ratios therefore correspond substantially to conventional four speed transmissions except that low changes to second by infinitesimal increment, second changes to third by a step which causes less than the usual drop in engine speed because of the differential connection, and third changes to high by infinitesimal increment.

The relief valve should hold the discharge pressure of the pumps to 80 pounds. The relief valve spring should therefore be made of 1/16" wire, coiled ⅜" pitch diameter, have 10 coils and a free length of 1.85".

The reversing ring gear has 75 teeth, sun gear 45 teeth and planets 15 teeth. The teeth are 14 pitch 20 degree P. A., nonhelical. The ratio will be 1⅔ to 1. The engine-to-wheel ratio for reversing will be 1⅔ times low gear or 20 to 1.

Operation

The operation of the mechanism may best be described by assuming certain driving conditions to exist and stating how they are met.

Assume then that the vehicle is at rest with the engine stopped and cold. In this case the shifting bar 296 had preferably be placed in the neutral position shown in the drawings.

This disconnects the transmission mechanism from the tail shaft 272 thru the reversing gear set. The driver now starts the engine and races it to warm it. The front pump only will operate. It will pump oil out of the bleeder passage 390 until the accelerator pedal is depressed sufficiently to raise the engine speed about 100 R. P. M. above idling speed, whereupon the valve 394 will be closed and the transmission brake engaged. If he races the engine past 2100 R. P. M., then releases the accelerator, the governor will shift up and release the brake and engage the clutch. This process may be continued for a minute or so, then the engine dropped to idling speed which again lets the front pump discharge thru the bleeder 390. The transmission brake will be disengaged. The sun gear 192 will rotate backwardly. The rotor 40 will idle forwardly with the impeller. The carrier 114 will be non rotative.

Assume now the driver wishes to back out of a parking space. He moves the hand control lever so as to shift the bar 296 forwardly until the detent ball 304 drops into the notch 314. This slides the teeth 264 into the teeth 252 which holds the reverse carrier 254 non rotative. When he again depresses the accelerator far enough to raise the engine speed above its idling speed, the valve 394 is closed, the transmission brake is thereby engaged, and the sun gear 192 thereby held from backward rotation. If resistance to backing is considerable, the stator 52 may also be held from backward rotation and torque multiplied thru both the hydraulic unit and the toothed gear set.

Forward rotation of the reversing sun gear produces backward rotation of the reversing ring gear. The engine-to-wheel ratio may be as much as 20 to 1 but may be much less if the resistance to backing is slight.

Assume next the driver wishes to go forward and that he is in a zone with traffic signals at close together intersections and the speed limit is 15 M. P. H. He will first use the hand control to slide the bar 296 rearward until the ball 304 drops into the notch 312. He is now set for all forward driving. With the engine running and the shifting bar so set, the transmission carried 114 is held non rotative, the sun gear 192 rotates idly backward, and the ring gear and rotor idle slowly forward with the impeller.

There is therefore no need for means to keep the rotor from following the impeller, as there is where the hydraulic unit must, under these condition, act as a clutch.

In starting from a full stop at any traffic signal he will depress the accelerator until the valve 394 closes, which will engage the transmission brake for low gear, then maintain low gear by quick acceleration to 10 or 12 M. P. H., then release the accelerator entirely. If, however, he chooses to accelerate less sharply, the hydraulic unit may, by gradual change, reach a condition where the overall ratio is equal to second gear, but since he must not exceed a speed of 15 M. P. H., the toothed gear-set will not be shifted to direct.

In either event when he has reached 10 or 12 M. P. H., he will release the accelerator, whereupon the valve 394 will open, the transmission brake will release and he will free wheel to the next stop. Free wheeling at speeds below 15 M. P. H., is highly desirable. No attention need be paid to the hand control when he comes to a stop unless he wishes to move backwardly.

Assume next he reaches a zone where the speed limit is as much as 20 M. P. H., and with traffic signals somewhat farther apart. In starting from a full stop, he will depress the accelerator to close the valve 394 which will engage the transmission brake, and, if acceleration is rapid, the stator will come to a stop so that there will be torque multiplication thru both the hydraulic unit and the gear-set for low gear. As acceleration proceeds the hydraulic unit will gradually reach a ratio making the overall ratio equal to second gear. In this ratio he may raise the vehicle speed to, say 18 M. P. H. He may now preferably momentarily release the accelerator completely, particularly if he is near enough the next traffic signal to coast the remainder of the distance.

When he releases the accelerator, however, the governor will shift up and allow the speed controlled valve 446 to engage the clutch and release the brake, thus shifting to direct drive thru both the hydraulic unit and the gear set for high gear.

In coasting to the next stop he will be doing so with engine braking in high, for the reason that the release of the accelerator and consequent opening of the valve 394 will only bleed the front pump, which never cooperates with the rear pump in engaging the clutch. Engine braking in high is desirable above 15 M. P. H.

Assume next that he has reached the last traffic signal with the open highway ahead and he desires to reach maximum vehicle speed in the shortest time. He may depress the accelerator fully. The stator will be stopped by its roller brake, the sun gear 192 will be stopped by engagement of the transmission brake, and low gear 12 to 1 engine-to-wheel ratio will be in effect. With full torque application, low gear will remain in effect up to 3600 engine R. P. M., which is 26 M. P. H., then the engine speed will remain at 3600 and the ratio thru the hydraulic unit gradually change from the 50% slip to a 35% slip, which change will provide a ratio of 8.4 to 1 engine-to-wheel, which is equal to second gear of common practice. This change under full torque application will have been reached with the engine still at 3600, whereby the vehicle speed will be 37 M. P. H. But the toothed gear-set will, up to this time, still be held in gear drive, because, with full accelerator depression, the governor spring will be only about one-third the length shown in the drawings, in which condition the governor will not shift up for third speed ratio until a speed of slightly over 3600 engine R. P. M.=1540 carrier R. P. M., which is slightly over 37 vehicle M. P. H., has been reached in second.

The change between second and third ratio is the first and the only change in ratio which is accomplished by a step requiring a pronounced drop in engine speed in relation to vehicle speed, and even then the drop in engine speed is not nearly as much as in other step transmissions.

What happens when, at the above speeds, the governor does shift up in spite of full accelerator depression, is as follows:

The clutch engages and connects the sun gear 166 directly to the engine. The brake disengages and frees the sun gear 192. The ring gear 112 is already connected to the rotor. The carrier 114 was being rotated thru second gear at 1540 R. P. M. Now were it not for the differential connection, the engine and the rotor would both have to drop to 1540 R. P. M. But since the rotor is merely powered hydraulically, the rotor takes the greater share of the speed drop, leaving the engine take less, i. e., whereas the slip between the impeller and rotor had reached as little as 35% just previous to the governor shift up, the slip again becomes about 50% after the governor shift up. To do this the engine must drop only to 2200 R. P. M. thereby bringing the rotor down to 1100 R. P. M. This connection, i. e., the toothed gear set in direct drive, and the hydraulic unit again converting torque at 50% slip corresponds to third gear of general practice which is about 5.2 to 1 engine-to-wheel ratio.

If maximum power is now continuously applied, with the third gear ratio of 5.2 to 1, engine-to-wheel, which is produced by a 50% slip between the impeller and rotor and with the stator operative, an engine speed of 3600 and rotor speed of 1800 will be reached when the vehicle speed has risen to 60 M. P. H.

From thence forward the engine speed again remains at 3600 and the ratio gradually changes from a 50% slip to a 2% or 3% slip which change will be fully consummated when the vehicle has reached a speed of about 85 M. P. H. Before this occurs, torque multiplication thru the hydraulic unit will have ceased and the device will be acting merely as a clutch.

It should be noted that during this rapid acceleration period, the slip between impeller and rotor in first and second ratios was at no time less than 35% which is within the range favorable to torque multiplication with the aid of the stator.

But whereas, in low and second, the rotor transmitted 100% of the torque, in third it must carry only 60% of the torque because of the differential connection. The rotor was therefore able to reach the 1 to 1 relation with the impeller, within 2% or 3%, even at full torque transmission. When it was reached the engine-to-wheel ratio was 3.62 to 1.

The foregoing ratio changes occurred under the continued application of maximum torque, remaining in low up to 26 M. P. H., changing gradually to second between 26 and 37 M. P. H., changing abruptly to third after 37 M. P. H., by dropping the engine speed, gradually raising the engine speed without changing the ratio until 60 M. P. H., is reached, then gradually changing the ratio from a 50% slip to a 2% slip which is consummated at 85 M. P. H.

Under a continued torque application of lesser magnitude, the ratio changes will become effective at proportionally lower speeds, for instance at slight accelerator depression instead of occurring at 26, 37, 60 and 85 M. P. H., they may occur at 11½, 16, 26 and 37.

A shift from low gear directly to high is practicable and desirable when the ultimate vehicle speed desired is less than 15 M. P. H. A shift of low, second, high is practicable and desirable for ultimate speeds of 16 to 35 M. P. H. These shifts from one ratio over the next to a third or to a fourth are made by starting with a heavy application of power and easing off to a lighter one.

After a shift to high at a relatively low vehicle speed, a return to third is readily made by simply applying torque sufficient to change the percentage of slip in the hydraulic unit. A still heavier torque application at low vehicle speed may reduce the ratio from high to second or even to low as the case may require.

Assume next the driver, while traveling 60 M. P. H., or over, suddenly sees ahead of him a steep hill, or a sharp bend in the road which will severely tax his vehicle brakes if he has only the normal engine braking in high to supplement them. He may now pull his hand control one notch past the forward driving position, i. e., with the notch 316 of the bar 296 over the ball 304.

This will cause the member 546 to act against the bellcrank 536 and return the speed controlled valve 446 to its lower position shown in the drawings, and thus apply the transmission brake for second ratio. The same movement of the bar 296 shifts the valve 392 far enough to cause the large end 405 to close the bleeder duct 390, for, if this were not done, both front and rear pumps would be relieved thru this bleeder as soon as the accelerator was released and the valve 394 opened and therefore the brake would not be engaged for second gear. The resistance of driving the engine thru the toothed gear-set at increased speed materially assists the vehicle brakes in such an emergency.

Again assume the driver stops now to park the vehicle on a comparatively steep incline and wishes therefore to supplement his parking brake with a rigid toothed connection. He will shift the hand control lever one position past the reversing position, i. e., with the notch 318 over the ball 304. This will connect both the carrier teeth 264 and the teeth of the reversing planet pinions 260 to the stationary teeth 252, thereby providing a locked up condition wherein the tail shaft 272 may not rotate. At the same movement of the bar 296, the valve 392 is moved to such a position that the bleeder duct 390 will discharge thru the groove 402.

Should the driver upon his return, forget that he has the hill lock applied, he may start and race the engine, but no harm will be done because, until he shifts out of the hill lock position, the discharge of the front pump thru the groove 402 will prevent the engagement of the transmission brake no matter how he manipulates the accelerator and the accelerator valve 394, and there will be no power connection to the vehicle. Since the vehicle is at rest, the rear pump will now be inoperative.

Finally, assume that the driver, with manual control in forward, unconsciously or purposely is coasting down an incline with a dead engine with a view of rotating it by vehicle movement. No help is available thru the front pump for that is engine driven, and consequently is now non-rotative. The rear pump will, however, begin rotation as soon as vehicle coasting begins. At several M. P. H., the driver may slightly depress the accelerator which will close the valve 394 and apply the transmission brake. As an alternative he may draw the hand control to the engine braking position, which will close the bleeder 390 by operation of the valve 392 in spite of the open accelerator operated valve 394. Or, as a further alternative, he may merely wait until coasting has brought the vehicle speed to 15 M. P. H., whereupon the governor will shift up and the rear pump will engage the clutch and drive the engine thru it. The same process may be employed when a dead battery compels a driver to start his engine by having his vehicle pushed from the rear.

I claim:

1. The combination, in a device of the character described, of an engine, an impeller connected for unitary rotation with the engine, a rotor, a driving gear on the rotor, a carrier, planet pinions on the carrier in mesh with the driving gear, two concentric gears in mesh with the planet pinions, a brake for holding one concentric gear non-rotative, a clutch for connecting the second concentric gear to the impeller for unitary rotation therewith, and speed responsive means operative at a certain speed to first disengage the brake then engage the clutch.

2. The structure of claim 1, and a connection to the engine accelerator whereby said certain speed is made higher in proportion as engine acceleration is greater.

3. In combination, a power source and transmission mechanism comprising, an impeller on the power source, a rotor, two driving gears on the rotor both connected thereto for unitary rotation therewith, a carrier, planet pinions on the carrier in mesh with said driving gears, a reaction gear connected to one of the driving gears thru said pinions, a differential gear connected to the other driving gear thru said pinions, means to hold said reaction gear non-rotative, and means to connect said differential gear to said impeller for unitary rotation therewith.

4. The combination of an engine and a transmission mechanism with an output member and two hydraulically engageable means, one for low ratio and the other for a higher ratio, a pump on the engine, a pump on the output member, both normally having their discharge sides connected to the low ratio engageable means, a bleeder valve for the low ratio engageable means normally open but connected to the accelerator, whereby said bleeder valve is closed when said accelerator raises the engine speed above its idling speed, a speed controlled valve, and speed responsive means for causing said speed controlled valve to operate at a certain speed to connect the discharge side of the second said pump to the high ratio engageable means and bleed the low ratio engageable means.

5. The structure of claim 4 with a connection from the speed responsive means to the engine accelerator whereby said certain speed is made higher as engine acceleration is greater.

6. The structure of claim 4 with a relief valve connecting the discharge and suction sides of the second said pump.

7. The structure of claim 4 with a manual control operable to a certain position to prevent said speed responsive means operating said speed controlled valve, or to return said speed controlled valve to its unoperated position if it has already been operated.

8. The structure of claim 4 with a manual control operable to a certain position to prevent said speed responsive means operating said speed controlled valve, or to return said speed controlled valve to its unoperated position if it has already been operated, with an additional valve between the accelerator operated bleeder valve and the low ratio engageable means, operable by movement of said manual control to said certain position, for closing the passage between said low ratio engageable means and said accelerator controlled bleeder valve.

9. In a transmission mechanism having an input and an output member, hydraulically engageable means for connecting said members in driving relation, fluid pressure means for operating said engageable means, means to lock the output member against rotation, a manual control means for operating said locking means, and means operable by said manual control when moved to the locking position to open a bleeder between said fluid pressure means and said hydraulically engageable means whereby said hydraulically engageable means may not be engaged when said output member is locked.

10. A planetary reversing gear-set comprising, a driving gear, a concentric driven gear, a carrier, planet pinions on the carrier in mesh with both said gears, means to hold the carrier non rotative, whereby the driving gear drives the driven gear backwardly, and means to hold both the carrier non rotative about its axis and the pinions non rotative about their respective axes whereby the driven gear is locked against rotation.

11. The structure of claim 10 with an engine, hydraulically operable means for connecting the engine and the said driving gear, fluid pressure means for operating the hydraulically operable means, and a bleeder for the fluid pressure means operative when said driven gear is locked against rotation as described.

12. In combination, an engine, an engine accelerator, an impeller affixed for unitary rotation with said engine, a rotor, a driving gear on the rotor, a carrier, planet pinions on the carrier in mesh with the driving gear, a reaction gear in mesh with said pinions, a brake for holding said reation gear non-rotative, means including an engageable clutch whereby said reaction gear is rotated by said engine, engine accelerator actuated means for engaging said brake and a speed responsive means for first disengaging said brake then engaging said clutch.

13. The structure of claim 12 wherein the speed responsive means is responsive to the speed of the carrier.

14. In combination, an engine, an engine accelerator, an impeller secured to the engine for unitary rotation, a rotor, a driving gear on the rotor a carrier, planet pinions on the carrier in mesh with the driving gear, a second gear in mesh with said pinions, a brake engageable to prevent rotation of said second gear, means including an engageable clutch whereby said second gear is connected to the engine for unitary rotation, engine accelerator operated means for controlling engagement of said brake, and speed responsive means for first effecting disengagement of said brake then controlling engagement of said clutch.

15. The structure of claim 14 wherein the clutch and brake are fluid pressure operated.

16. The structure of claim 14 wherein the clutch and brake are fluid pressure operated and wherein the engine accelerator operated means includes a valve for controlling the brake fluid pressure and the speed responsive means includes a second valve for controlling the clutch fluid pressure.

17. In combination, an engine, an engine accelerator, a speed responsive governor, an impeller secured to the engine to rotate therewith, a rotor, a driving gear on the rotor, a carrier, planet pinions on the carrier in mesh with the driving gear, a second gear in mesh with the pinions, a brake appliable to prevent rotation of the second gear, means including an engageable clutch whereby said second gear may be connected to the engine to rotate therewith, fluid pressure operated means for applying said brake, fluid pressure operated means for engaging said clutch, an accelerator operated valve for controlling said brake fluid pressure operated means, a governor operated valve for controlling said clutch fluid pressure operated means and a manually controlled valve operable to one position to prevent said accelerator operated valve engaging said brake and to another position to prevent said accelerator operated valve disengaging said brake.

18. In combination, an engine, an engine accelerator, an impeller secured for unitary rotation with the engine, a rotor, a driving gear on the rotor, a carrier, planet pinions on the carrier in mesh with the driving gear, a second gear in mesh with said pinions, a brake adapted to prevent rotation of said secod gear, engine accelerator actuated means for engaging said brake, means including a clutch operative upon engagement to cause said second gear to rotate in unison with said engine, a speed responsive means normally operative at a predetermined speed to first disengage said brake then engage said clutch, and a manual means operable to prevent the operation of said speed responsive means from disengaging said brake and engaging said clutch or to reengage said brake and disengage said clutch after said brake and clutch have respectively been disengaged and engaged by said speed responsive means.

19. The struture of claim 18 wherein the manual means is operable to one position to prevent engagement of the clutch and to another position to prevent engagement of the brake.

20. The combination with an engine, of transmission mechanism comprising, an impeller secured to the engine for unitary rotation therewith, a rotor adjacent said impeller and adapted to be rotated thereby, a driving gear on the rotor, a carrier, planet pinions on the carrier in mesh with the driving gear, a second gear in mesh with said pinions, a fluid pressure operated brake adapted when applied to prevent rotation of said second gear, means including a fluid pressure operated clutch adapted when engaged to compel rotation of said second gear in unison with said engine, a fluid pressure supplying means, a speed responsive device, a first valve operative in its normal position to direct fluid to said brake to apply said brake but operable by said speed responsive device above a certain speed to direct fluid to said clutch to apply said clutch, an engine accelerator, a second valve adapted to be closed by accelerator depression to direct fluid to said brake to apply said brake, a third valve adapted to be closed to direct fluid to said brake to apply said brake when said second valve is open, and a manual means to simultaneously close the third valve and hold said first valve in its unoperated position.

21. The structure of claim 20 with a connection between said accelerator and said speed responsive device, whereby increase in accelerator application raises the speed at which said speed responsive device becomes operative.

22. The structure of claim 20 wherein there is a transmission output shaft, a positive lock for said shaft to prevent rotation, valve means operable to open position to prevent actuation of said brake, and manual means to simultaneously engage said locking means and open said valve means.

23. The structure of claim 20 wherein the fluid pressure supplying means comprises means operated by engine rotation and means operated by carrier rotation with capacity to be operative together or separately.

24. The structure of claim 20 wherein the fluid pressure means comprises a pump rotated by the engine and a second pump rotated by the carrier, either or both being arranged to supply fluid to the brake but the carrier driven pump only being arranged to supply fluid to the clutch.

25. The combination with a power source, of a hydraulic unit having an impeller driven by the power source and a rotor driven by said impeller, two driving gears secured to the rotor for unitary rotation therewith, two gears concentric with the driving gears, planet pinions connecting the concentric gears to the driving gears, a carrier for said pinions, means engageable to retard rotation of one of said concentric gears, and means engageable to join the other concentric gear to the impeller to be rotated thereby.

26. The structure of claim 25 with means to control the power being supplied by said power source, and means operated by said control means to engage said retarding means.

27. The structure of claim 25 with means to control the power being supplied by said power source, means operated by said control means to engage said retarding means, and a speed responsive device operative at a certain speed to first disengage said retarding means then engage said joining means.

28. The structure of claim 25 with means to control the power being supplied by said power source, a speed responsive means operative at a certain speed to engage said joining means, and means connecting the power controlling means and the speed responsive means whereby the said certain speed is higher as the power being supplied by the power source is greater.

29. The structure of claim 25 with a speed responsive means operative at a certain speed to disengage the retarding means and engage the joining means, and manual means operable to prevent the speed responsive means from becoming operative or to return it to, and hold it in its inoperative state after it has become operative.

30. In combination, an engine, an engine accelerator, and power transmission mechanism having a brake engageable for gear drive and a clutch engageable for direct drive, fluid pressure means for engaging said brake and clutch, a valve operable to closed position by accelerator actuation to direct fluid pressure to said brake to engage said brake and to open position by accelerator release to bleed fluid pressure from said brake to disengage said brake, a speed controlled valve, biased in its unsupported position to direct fluid pressure to said brake and bleed fluid pressure from said clutch, whereby said brake may be engaged thru said second valve if said first valve is not in bleeder position, but operative at a certain speed to bleed fluid pressure from said brake and direct fluid pressure to said clutch, whereby, below said certain speed, said brake will always be disengaged when said accelerator is released, but, above said certain speed, said clutch will not be disengaged when said accelerator is released.

FREDERICK W. COTTERMAN.